US008356642B2

(12) United States Patent
Murphy et al.

(10) Patent No.: US 8,356,642 B2
(45) Date of Patent: Jan. 22, 2013

(54) AUTOMOTIVE SERVICE EQUIPMENT AND METHOD FOR BRAKE FLUID EXCHANGE WITH WIRELESS BRAKE BLEEDING SYSTEM

(75) Inventors: Jeffrey B. Murphy, Millersville, PA (US); Eric I. Shultz, Mount Joy, PA (US); Thomas L. Crandall, York, PA (US)

(73) Assignee: RTI Technologies, Inc., York, PA (US)

( * ) Notice: Subject to any disclaimer, the term of this patent is extended or adjusted under 35 U.S.C. 154(b) by 0 days.

(21) Appl. No.: 13/534,173

(22) Filed: Jun. 27, 2012

(65) Prior Publication Data

US 2012/0267003 A1    Oct. 25, 2012

Related U.S. Application Data (62) Division of application No. 11/832,119, filed on Aug. 1, 2007, now Pat. No. 8,215,343.

(51) Int. Cl.
*B65B 35/00* (2006.01)

(52) U.S. Cl. .................. 141/8; 141/4; 141/65; 141/98; 141/99; 141/192; 188/352

(58) Field of Classification Search .................. 141/1, 4, 141/8, 65, 98, 99, 192, 302; 188/352; 184/1.5
See application file for complete search history.

(56) References Cited

U.S. PATENT DOCUMENTS

| 5,403,078 | A | 4/1995 | Farr |
| 5,509,730 | A | 4/1996 | Ando et al. |
| 5,538,335 | A | 7/1996 | Saito et al. |
| 5,678,901 | A | 10/1997 | Lee et al. |
| 6,302,167 | B1 | 10/2001 | Hollub |
| 6,481,469 | B1 | 11/2002 | Erwin et al. |
| 6,536,486 | B2 | 3/2003 | Erwin et al. |
| 6,796,339 | B1 | 9/2004 | Petty |
| 6,929,036 | B2 | 8/2005 | Awad |
| 7,096,894 | B1 | 8/2006 | Hollub et al. |
| 7,152,636 | B2 | 12/2006 | Petty |
| 7,281,551 | B2 | 10/2007 | Mengelt |
| 7,357,161 | B2 | 4/2008 | Flournoy |
| 8,215,343 | B2 * | 7/2012 | Murphy et al. .................. 141/98 |

* cited by examiner

*Primary Examiner* — Timothy L Maust (74) *Attorney, Agent, or Firm* — Antonelli, Terry, Stout & Kraus, LLP.

(57) ABSTRACT

Automotive service equipment for brake fluid exchange includes a central unit having a controller for operating the equipment and a communication module for wirelessly communicating with each of a plurality of remote bleed modules to control bleeding brake fluid from respective brake bleeders of a vehicle connected to the modules. The brake fluid from the brake bleeders is stored in containers in the modules for later removal. When disconnected from the brake bleeders, the modules are moved to docking stations on the central unit for emptying brake fluid from the module containers and vacuum charging the containers for brake bleeding. The automotive service equipment and related method of performing brake fluid exchange in an automotive vehicle avoid the use of hoses for returning the waste fluid to the central unit thus reducing the problem of storage and handling of such hoses and spillage of residual fluid left in the hoses.

7 Claims, 13 Drawing Sheets

AUTOMOTIVE SERVICE EQUIPMENT AND METHOD FOR BRAKE FLUID EXCHANGE WITH WIRELESS BRAKE BLEEDING SYSTEM

RELATED APPLICATION

This application is a divisional application of application Ser. No. 11/832,119, filed Aug. 1, 2007 now U.S. Pat. No. 8,215,343, the disclosure of which is hereby incorporated by reference.

TECHNICAL FIELD

The present invention is an improved automotive service equipment for brake fluid exchange having a wireless brake bleeding system. A method of performing brake fluid exchange in an automotive vehicle using the equipment is also disclosed.

BACKGROUND AND SUMMARY

One of the current problems with all commercially available automatic brake bleed systems is the handling and entanglement of the hoses. Most machines require six hoses—one for emptying the master cylinder, one for filling and pressurizing the master cylinder (these are separate to minimize intermixing of old and new fluids), and one each for removal of the fluid from each of the four individual brake bleeder locations on the vehicle and returning the waste fluid to the unit. Storage and handling of this many hoses is an issue, and in addition to spillage from residual fluid left in the hoses, they frequently become entangled, resulting in operator frustration and lost time to untangle them before the next use.

One aim of the present invention is to provide an improved automotive service equipment for brake fluid exchange which avoids or reduces such problems with conventional automatic brake bleed systems. Instead of returning the waste fluid from each of the brake bleeders via a hose to the main unit as in the known commercially available automatic brake bleed systems, according to the invention the waste fluid from the brake bleeders is stored in at least one, and preferably in a plurality of remote bleed modules at respective ones of the brake bleeders for later removal. These volumes of waste fluid are relatively small, less than 12 ounces. Waste fluid is removed when the modules are docked with a central unit of the automotive service equipment at the end of the service. The modules are controlled remotely by the central unit through radio frequency or similar wireless technology.

More particularly, an automotive service equipment for brake fluid exchange according to the invention comprises a central unit including a controller for operating the equipment for exchanging used brake fluid in a vehicle with new brake fluid. The central unit has means for wirelessly transmitting signals to control brake bleeding during brake fluid exchange. At least one remote bleed module is provided. The module includes a fluid passage for connection to a brake bleeder of a vehicle for conveying brake fluid from the brake bleeder during brake fluid exchange. The module further includes a valve for opening and closing the fluid passage, a container for receiving and storing for later removal brake fluid conveyed through the fluid passage when the passage is opened by the valve, and means responsive to the wirelessly transmitted signals from the central unit for opening and closing the valve.

The container in the remote bleed module in the disclosed example embodiment of the invention is a sealed container capable of holding a vacuum charge and brake fluid. A plurality of remote bleed modules for connection to respective ones of a plurality of brake bleeders of a vehicle to be serviced are provided in the example embodiment. The controller of the central unit operates the remote bleed modules for bleeding brake fluid from the plurality of brake bleeders sequentially during servicing a vehicle.

The central unit further includes at least one docking station upon which at least one remote bleed module can be moved to and docked when not connected to a brake bleeder. A drain in the container is actuable when the module is docked at the docking station. A vacuum pump of the central unit removes brake fluid from and provides an initial vacuum charge to the container of the module docked on the central unit. The central unit includes a container for receiving brake fluid removed from the module docked on a docking station of the central unit.

The remote bleed modules each include a power source for operating the means responsive to the wirelessly transmitted signals from the central unit. In the example embodiment, the power source is rechargeable and the central unit includes means for recharging the power source when the module is docked at a docking station of the central unit. The fluid passage of the remote bleed module in the disclosed embodiment includes a hose and an adapter to connect to a brake bleeder of an automotive vehicle. The remote bleed module further includes means responsive to the wirelessly transmitted signals from the central unit for alerting an operator to close a brake bleeder connected to the fluid passage of the module.

The central unit of the automotive service equipment includes a container for new brake fluid in addition to the aforementioned container for receiving used brake fluid, hoses and adapters for emptying and filling master cylinders, a pressure pump and at least one controlling sensor and a vacuum pump for respectively supplying and pressurizing new brake fluid from the new brake fluid container to master cylinders, and emptying used brake fluid from master cylinders to the used brake fluid container.

An improved method for exchanging brake fluid in an automobile in accordance with the invention, using an automotive service equipment of the invention having a central unit with a controller for operating equipment and at least one automatic mode of operation, comprises emptying used brake fluid from the master cylinder of the vehicle, filling the master cylinder with new brake fluid, pressurizing the master cylinder, bleeding brake fluid from brake bleeders of the vehicle and replenishing the new fluid in the master cylinder as necessary, wherein the brake fluid bled from the brake bleeders is stored, for later removal from, in containers of remote bleed modules connected to respective ones of the brake bleeders.

The method and automotive service equipment of the invention advantageously avoid the use of hoses for returning the brake fluid to the central unit thus reducing the problem of storage and handling of such hoses and spillage of residual fluid left in the hoses. These and other features and advantages of the invention will be more apparent from the following detailed description taken with the accompanying drawings.

DETAILED DESCRIPTION

Referring now to the drawings, an automotive service equipment for brake fluid exchange according to the invention comprises four remote bleed modules 1, refer to FIGS. 1A to 4, and a central unit 2 with controlling electronics 17 for operating the equipment in at least one automatic mode of operation for bleeding the brakes of an automotive vehicle. Each module 1 is controlled remotely by the central unit through radio frequency or similar wireless technology in the controlling electronics 17, see the wireless communication represented by $W_1$ in FIG. 5.

Figure 3:
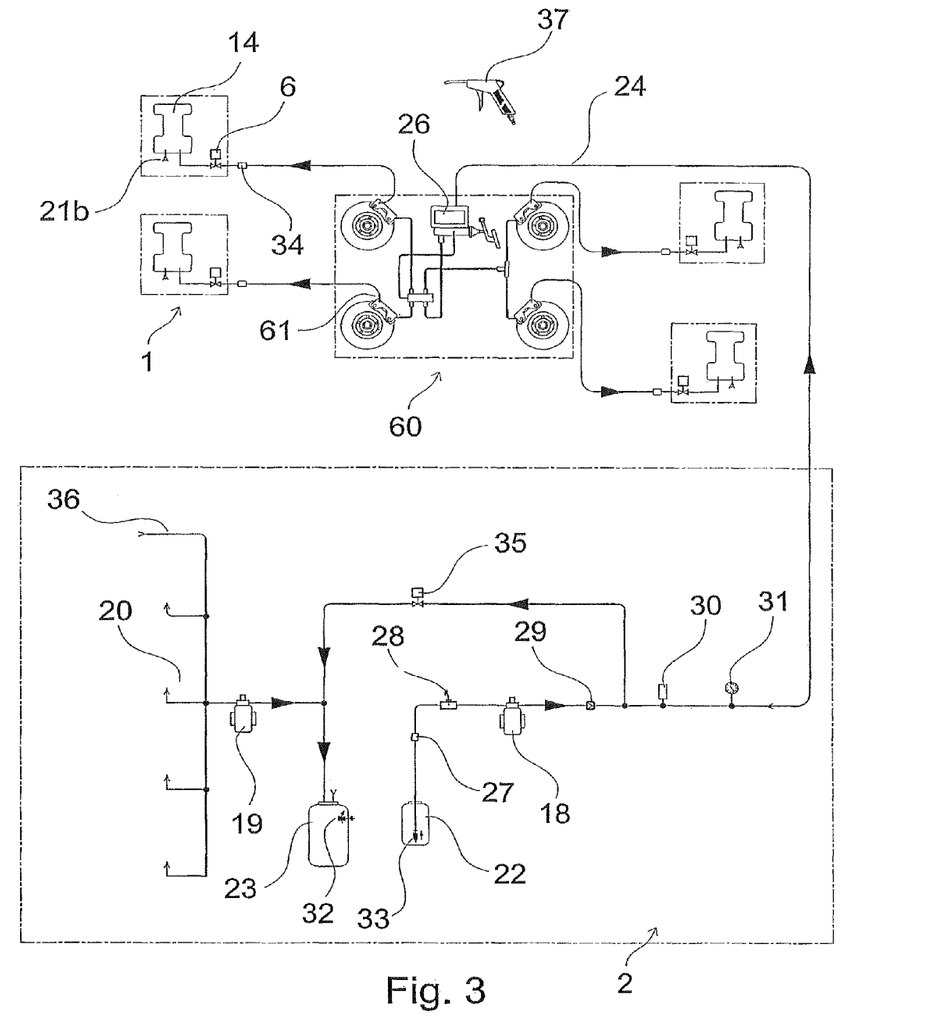
FIG. 3 is a schematic diagram of the automotive service equipment of FIGS. 1A-FIG. 2E connected to the brake bleeders of the vehicle to be serviced, the diagram showing the fluid circuits and components of the equipment for brake fluid exchange in the vehicle.
Figure 4:
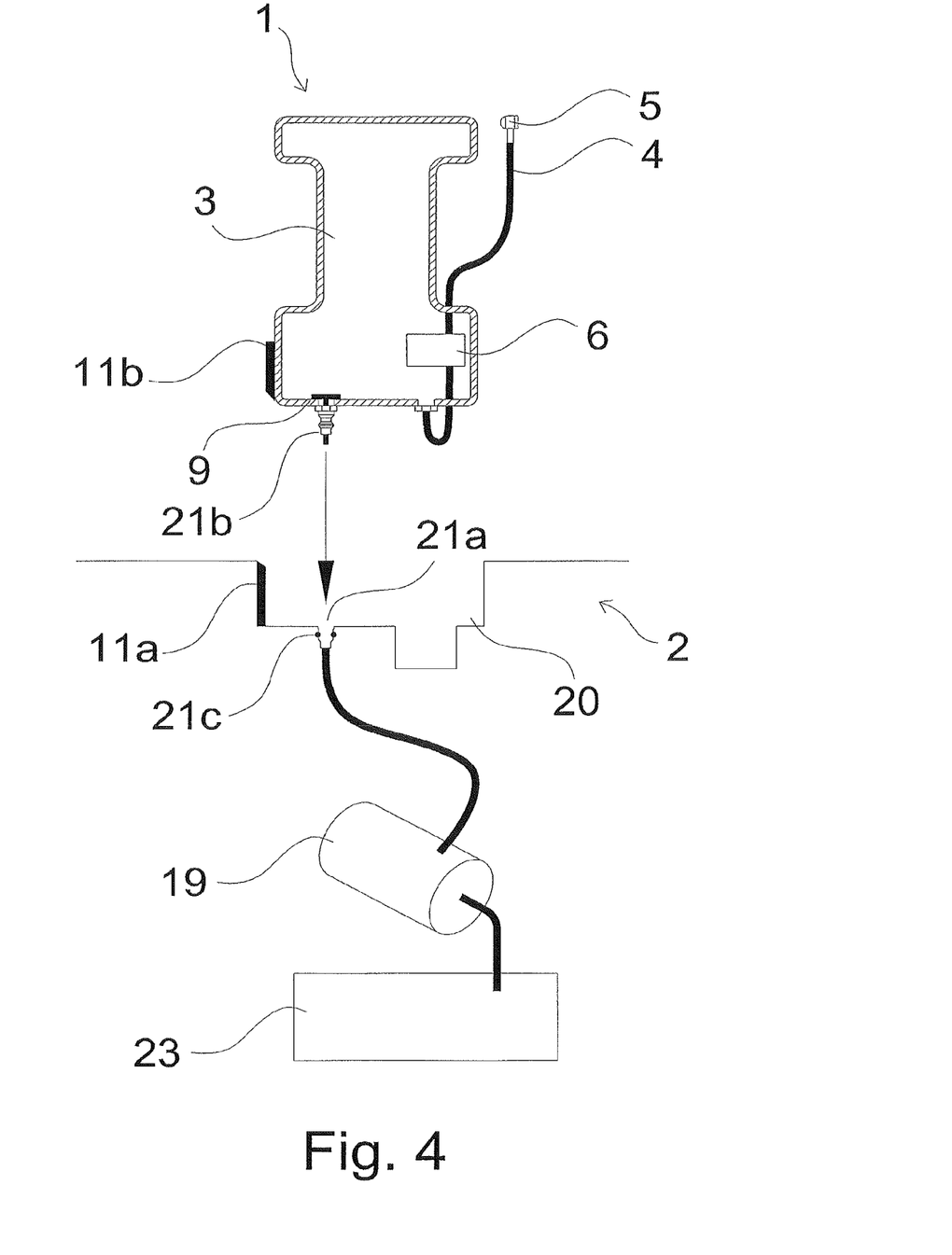
FIG. 4 is a schematic drawing of a remote bleed module of the automotive service equipment of FIGS. 1A-3 showing a docking station of the central unit to which the module can be docked.

Each of the remote bleed modules 1 has a sealed container 3, FIG. 4, to hold a vacuum charge and waste fluid. A hose 4 and appropriate adapter 5 to connect the module to the brake bleeder, 61 in FIG. 3, on an automotive vehicle being serviced provide a fluid passage connecting the module to the brake bleeder and convey brake fluid from the brake bleeder during brake fluid exchange. A solenoid operated valve 6 or other normally closed valve is provided between the brake bleeder adapter/hose and the container 3 for opening and closing the fluid passage between the brake bleeder of the vehicle and the container. A printed circuit board 7 of the module has an antenna to receive wirelessly transmitted signals $W_1$, FIG. 5, from the central unit, and has signal processing circuitry to control the operation of the valve 6 and provide necessary information, i.e. visual indication as required via light emitting diodes 8 to the technician during service as explained below. The remote bleed modules 1 further include a drain feature, a check valve 9 in the example embodiment, see FIG. 4, that is activated through mechanical means or vacuum when the module is docked with the central unit as described hereinafter.

Figure 1A:
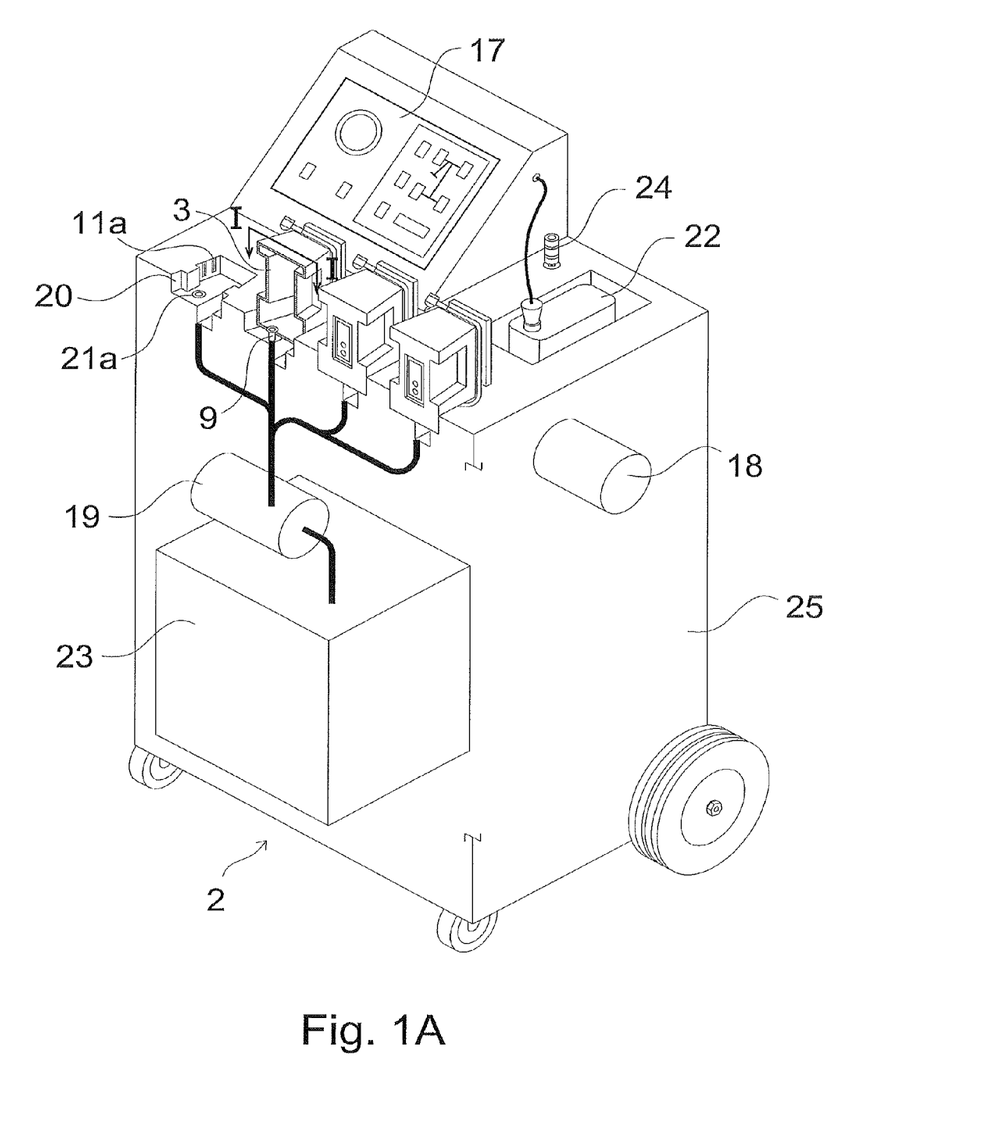
FIG. 1A is a perspective view, from the right front and above, of a central unit of an automotive service equipment for brake fluid exchange according to a preferred embodiment of the invention, with three remote bleed modules of the equipment docked at docking stations on the central unit, the left module being sectioned at I-I to show a brake fluid container and drain in the module, with the cabinet of the unit in front and on the right being omitted to show internal components of the unit.
Figure 1B:
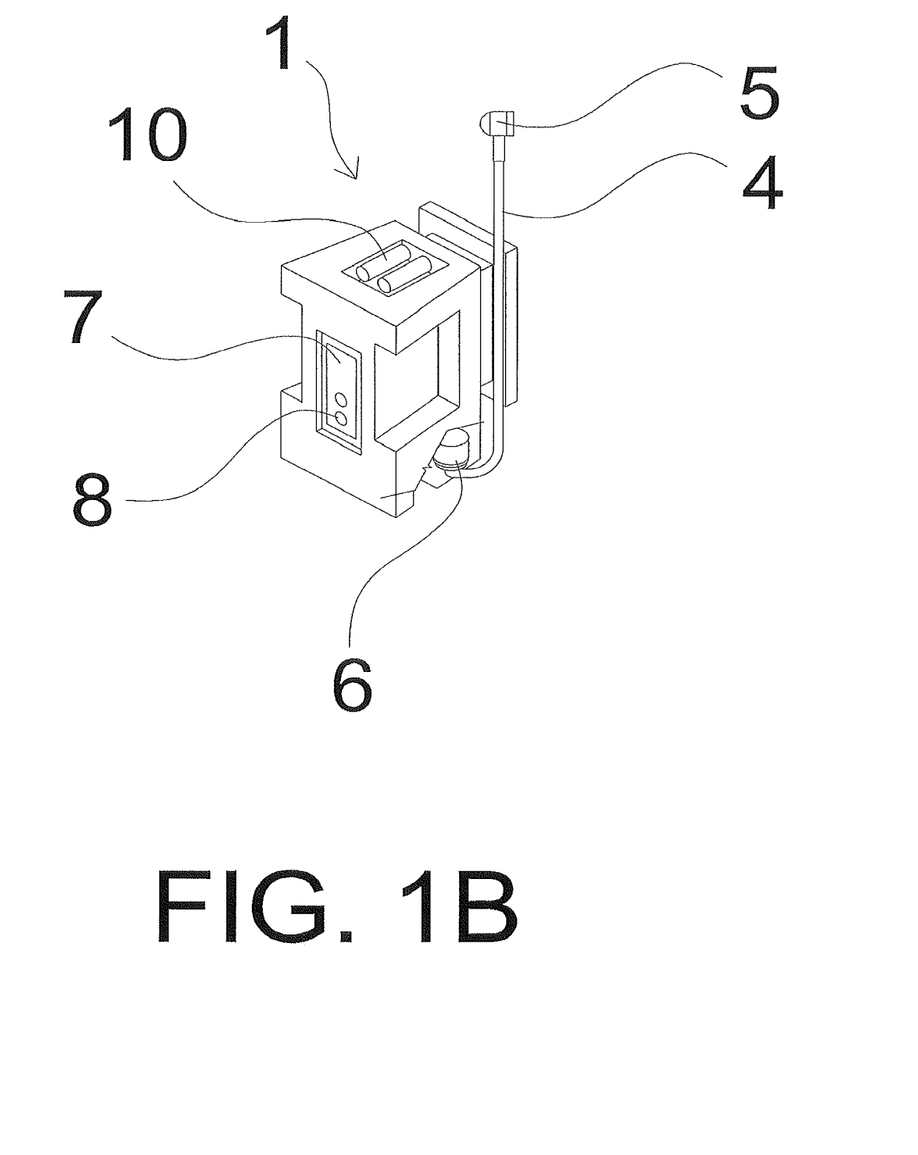
FIG. 1B is a perspective view, from the right front and above, of a remote bleed module which has been removed from one of the docking stations on the central unit of FIG. 1A.
Figure 2A:
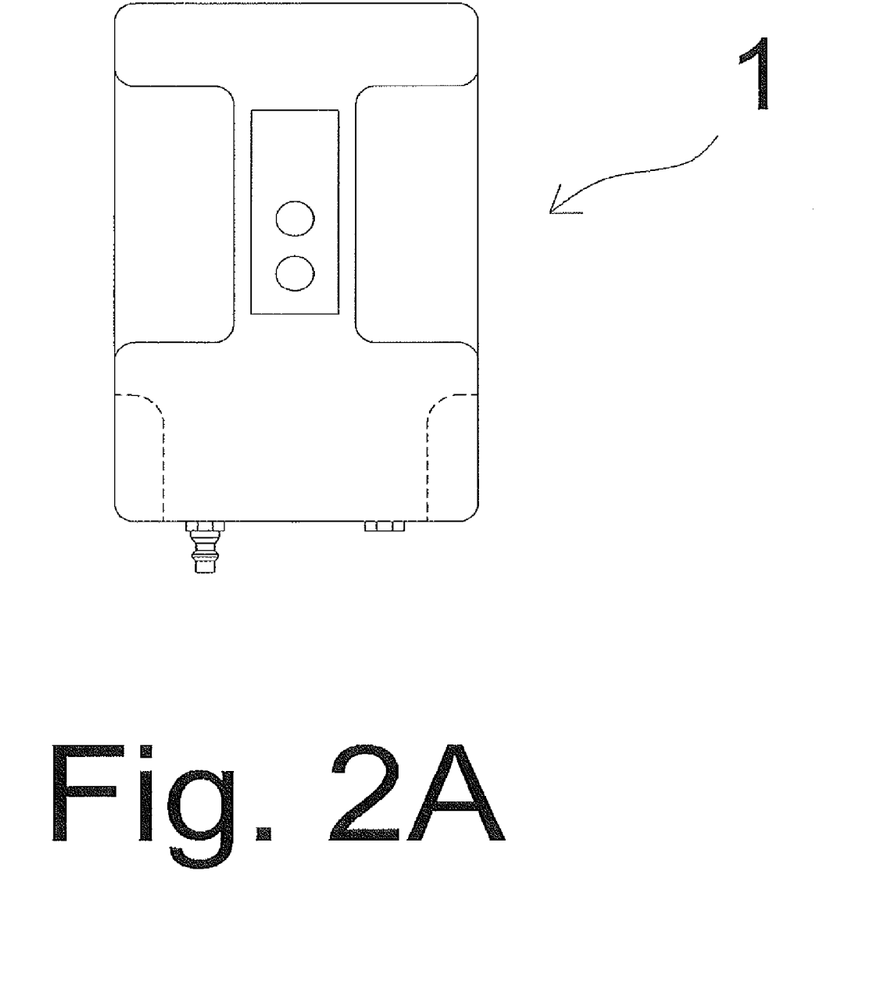
FIGS. 2A, 2B, 2C, 2D and 2E are respectively front, right, back, top and bottom side views of a remote bleed module of the brake bleed equipment of FIGS. 1A and 1B.
Figure 2B:
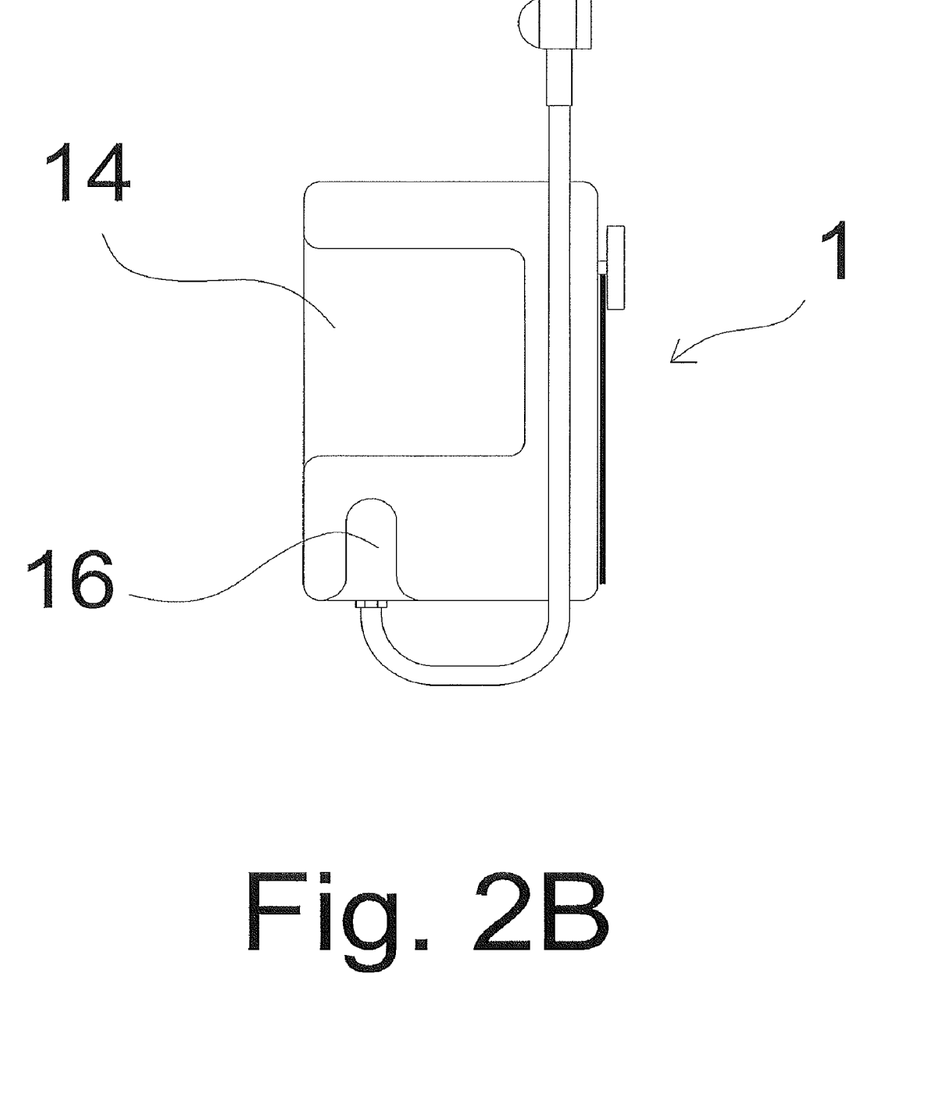
Figure 2C:
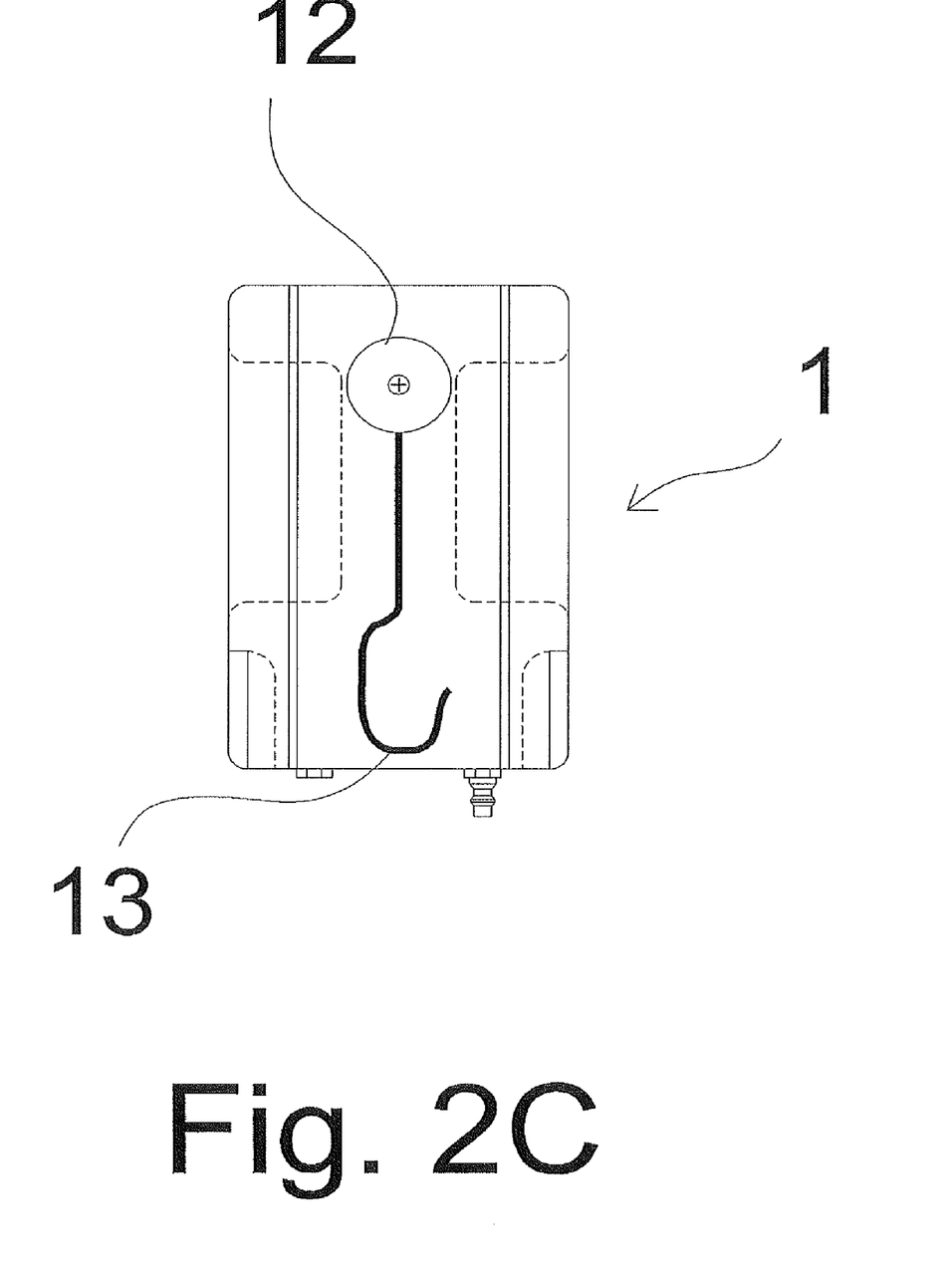
Figure 2D:
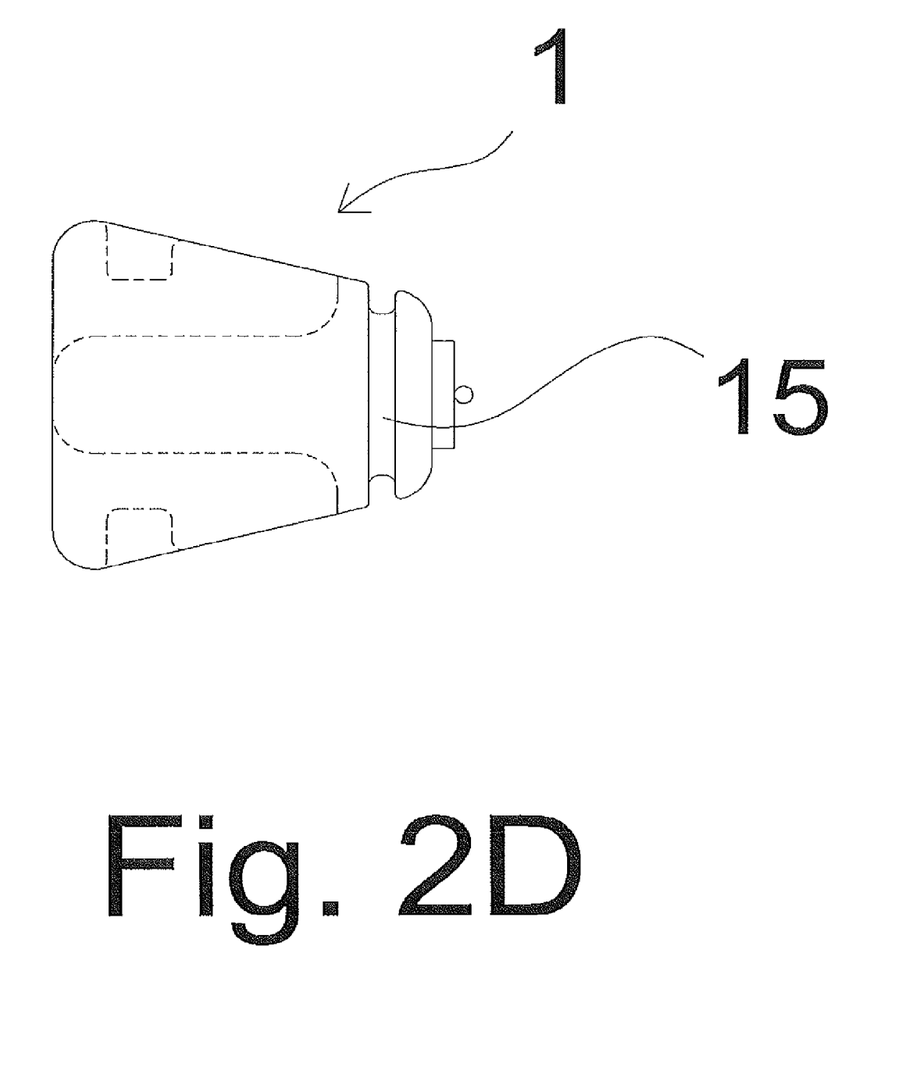
Figure 2E:
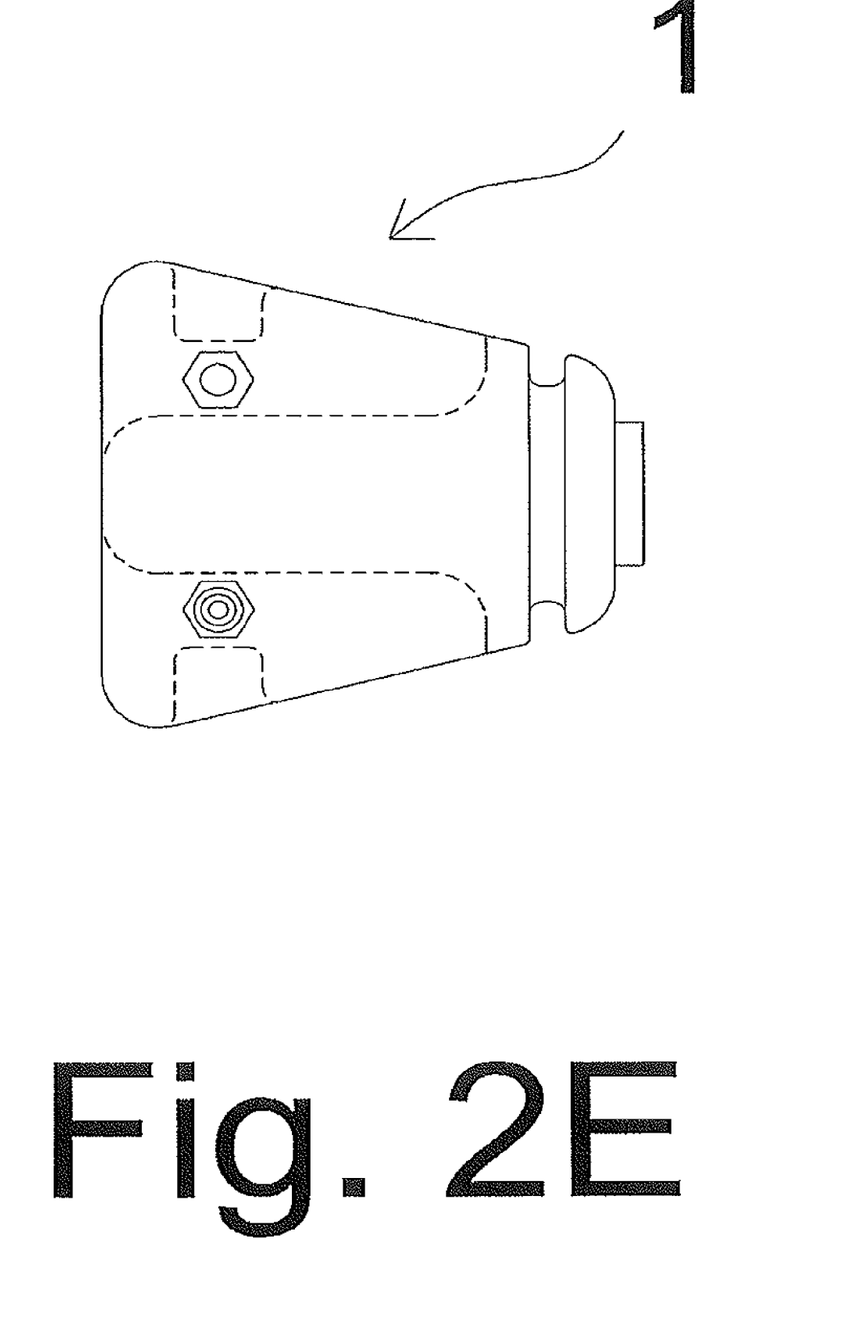
Figure 5:
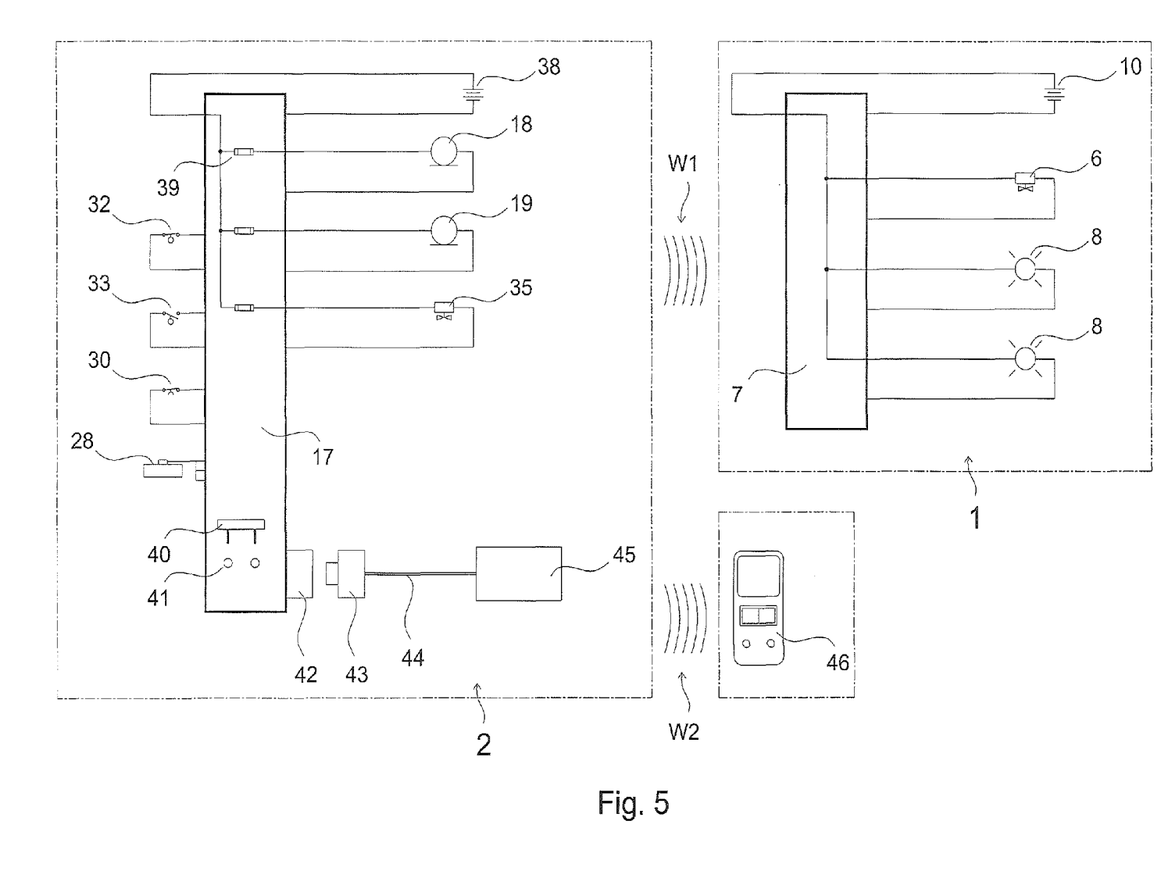
FIG. 5 is a schematic electrical diagram of the central unit and a remote bleed module of the automotive service equipment of the example embodiment of FIGS. 1A-4 together with a TechAlert portable communication module of the type disclosed in commonly owned U.S. patent application Ser. No. 11/797,165, now U.S. Pat. No. 7,778,751 issued Aug. 17, 2010, and Ser. No. 11/797,193, now U.S. Pat. No. 7,975,731 issued Jul. 12, 2011, the disclosures of which are incorporated herein by reference.

The remote bleed modules further include a battery, super capacitor or other means of power 10, FIGS. 1B and 5, and/or a charging system to provide the necessary power for operation of the printed circuit board, valve and light emitting diodes of the undocked modules. Electrical contacts 11b, FIG. 4, of the modules are automatically engaged with electrical contacts 11a when the module is docked with the central unit for recharging the power source 10. As shown in FIG. 2C, the back of the modules are provided with a magnetic attachment 12 for fixing to steel lifts, etc., and a retractable hook 13 for hanging the modules from the suspension of a vehicle being serviced, or other means. These devices enable the modules to be located near respective ones of the individual brake bleeders 61 of the vehicle as depicted in FIG. 3. The cabinet for the modules has a handle and/or overall shape 14 conducive to single-hand maneuvering by the technician, an integrated hose storage 15 for the hose 4, and docking alignment elements 16 which facilitate docking of the modules with the central unit.

The remote bleed modules are adapted to have their sealed containers 3 initially vacuum charged while the modules are docked with the central unit at docking stations 20 thereof, FIGS. 1A and 4. The electrical contacts 11b (only one is visible in FIG. 4) meet and make electrical connection with the two mating electrical contacts 11a as the module is inserted vertically into the port at the docking station. Electrical power from the central unit is thereby available to charge the internal power source 10 of the module.

The module has a male fitting 21b which mates with the female fitting 21a in the docking station as the module is inserted vertically into the docking station. A tight seal between the fittings is accomplished by an o-ring 21c. The check valve 9 seals fitting 21b when the module is not docked. When the module is docked, the check valve opens fitting 21b.

The module 1 is in the form of the sealed container 3 as shown most clearly in FIG. 4. Connected to the container is the hose 4 with appropriate adapter 5 to connect the module to a brake bleeder. The solenoid valve 6 is connected in-line with hose 4. When the module is docked, the check valve 9 opens whereby a vacuum pump 19, FIGS. 1A, 3, 4 and 5, in the central unit will draw a vacuum on container 3. Used brake fluid which may be in the container 3 will initially be extracted by this vacuum and deposited in a waste tank or container 23 in the central unit. As the pump continues to run, a vacuum will be drawn on container 3 thereby charging the container of the module for drawing brake fluid from a brake bleeder. Check valve 9 closes as the module is undocked thereby maintaining the vacuum drawn by pump 19 on the container 3.

Connection of the adapter 5 to a brake bleeder 61 of a vehicle and activation of the solenoid valve 6 will apply the vacuum in the container 3 to the brake bleeder to extract brake fluid. The signal to activate the solenoid valve 6 is received from the printed circuit board 7 of the module which is controlled wirelessly from the central unit. Simultaneously with applying the vacuum in container 3 to the brake bleeder, positive pressure and fluid replacement is applied to the brake system master cylinder/reservoir 26, FIG. 3. In use, once the appropriate amount of fluid has been flushed through the brake system of the vehicle, the central unit transmits a signal for the valve of the module to close, and then signals the next module to open its valve. The process continues until all four module-brake bleeder combinations have been completed.

The central unit then alerts the operator to close the bleeders and disconnect the modules and wirelessly signals the appropriate module to flash the light emitting diodes 8 thereon. According to the preferred sequence for closing, the valve 6 on the module with flashing diodes again opens, and a slight positive pressure is applied to the master cylinder by the central unit to prevent any trapped air as the technician closes the bleeder connected to the module. Once the bleeder is closed by the technician, and the central unit detects no flow by flow meter 28, FIG. 3, the central unit allows the current module to drain the fluid from the hose for a few seconds, then closes the valve of the module. It then sends a signal to the next module and the process is repeated until all bleeders are closed. The hoses and adapters are then detached by the technician at each of the bleeders, and the modules are returned to the central unit for docking. Once docked, draining of the waste fluid and recharging of the module power sources and vacuum charging of the module containers is performed.

The controlling electronics 17 of the central unit 2 shown in FIG. 5 preferably include a digital electronic controller for the operation of the equipment when servicing a vehicle according to the automatic mode of operation illustrated in FIGS. 7A and 7B and described hereinafter. Electrical outputs from the controller control the equipment based on logic software of a programmed processor such as a microprocessor of the controller.

Well known power/ground connections to ICs and other components may not be shown within the Figs. for simplicity of illustration and discussion, and so as not to obscure the invention. Arrangements may be shown in block diagram form in order to avoid obscuring the invention, and signals (e.g., wireless signals) may be shown in simplicit line form, and also in view of the fact that specifics with respect to implementation of such block diagram and signal arrangements are highly dependent upon the platform within which the present invention is to be implemented, i.e., such specifics should be well within the purview of one skilled in the art. In other instances, detailed descriptions of well-known methods and components are omitted so as not to obscure the description of the invention with unnecessary/excessive detail. Where specific details (e.g., circuits, flow charts) are set forth in order to describe the example embodiment of the invention, it should be apparent to one skilled in the art that the invention can be practiced without, or with variation of, these specific details. Finally it should be apparent that differing combinations of hard-wired circuitry and software instructions can be used to implement embodiments of the present invention, i.e., the present invention is not limited to any specific combination of hardware and software.

The controlling electronics 17 of the central unit further include an electronic circuit with wireless communication ability. This would include a wireless transmitter and a wireless receiver coupled to a suitable antenna or other transmission medium coupler as will be readily understood by the skilled artisan. Similar components are provided in the modules. The transmitters and receivers may be either radio frequency (RF) or infrared (IR) devices, but they are of the same type. Signals wirelessly communicated by the central unit to the modules include (but are not limited to) signals to open and close the valves 6 for bleeding fluid from the brake bleeders connected to the modules and signals for turning the light emitting diodes on and off to indicate the sequence for closing the bleeders at the end of a brake fluid exchange.

The central unit 2 as shown in FIGS. 1A, 3 and 5 has a pump 18 and controlling sensors including pressure switch 30 for filling and applying pressure to the master cylinder/reservoir 26 in the vehicle being serviced. The vacuum pump 19 of the central unit is for emptying the master cylinder in addition to initially charging the sealed containers of the modules and removing waste fluid from the containers of the modules when docked at docking stations 20 as noted above. New fluid is supplied from a tank/container 22 of the central unit while the waste fluid tank/container 23 receives the waste fluid removed from the modules and the master cylinder. Hose 24 and various adapters are used for draining/filling master cylinders 26. The central unit is housed within an integrated cabinet/enclosure 25 on wheels for portability.

The basic functionality of the central unit 2 encompasses providing a vacuum charge to the individual docked modules 1 upon service initialization. An interface to the technician of the central unit is shown in detail in FIG. 6. The interface permits the technician to specify fluid exchange amount and the bleeder sequence in a brake fluid exchange for a vehicle, and provides process status and/or action required indications to the technician as discussed in more detail below in connection with FIGS. 7A and 7B. The central unit serves to connect to the master cylinder/reservoir 26 of the vehicle being serviced to remove used fluid, refill with new fluid, apply pressure and replenish new fluid as necessary. Once service commences, the central unit monitors and controls the overall process and communicates with each module 1. Once fluid replacement is complete, the central unit alerts the technician via audible and/or visual alert and/or the aforementioned TechAlert remote module 46, FIG. 5, that the process is complete and that the bleeders need to be closed. Once the technician activates the "close bleeder" sequence, the central unit applies pressure to the master cylinder and sequentially sends signals to each module to activate "attention required" light emitting diodes 8 and open the module's valve 6. As described above, once a technician closes the bleeder at the module and the central unit senses no flow, it activates the next module for the bleeder to be closed. When the modules are returned to their docking position on the central unit at service completion, the central unit provides draining capabilities for the waste fluid in containers 3 and recharging of the module power source 10, e.g., batteries. The central unit includes the charging capability/circuitry for recharging the power sources of the modules.

The method for exchanging brake fluid in an automotive vehicle using the automotive service equipment of the invention is illustrated in FIG. 3, which shows the component configuration of the central unit and the four remote bleed modules 1 connected to the brake bleeders 61 of a vehicle brake system 60. As noted above, the sealed container 3 of each module would have been drawn into a vacuum while docked on the central unit docking stations 20. The printed circuit board/controller 7 in each module is in wireless communication with the central unit controller. Signals are transmitted from the central unit controller to open and close solenoid valve 6. When solenoid valve 6 is open, the vacuum in the module container will cause brake fluid to be drawn from the brake caliber cylinder via a brake bleeder at the four brakes/wheels of the vehicle. A filter 34 in the hose traps any particulates which may be in the used brake fluid. Extracted brake fluid is stored in the container 3 of the module until the module is docked on the central unit.

Hose 36 of the central unit as shown in FIG. 3 is used to extract as much used fluid from the master cylinder/reservoir 26 of the vehicle brake system 60 as possible. Then wand 37 is connected to hose 24 and used to refill the reservoir with new fluid.

Figure 6:
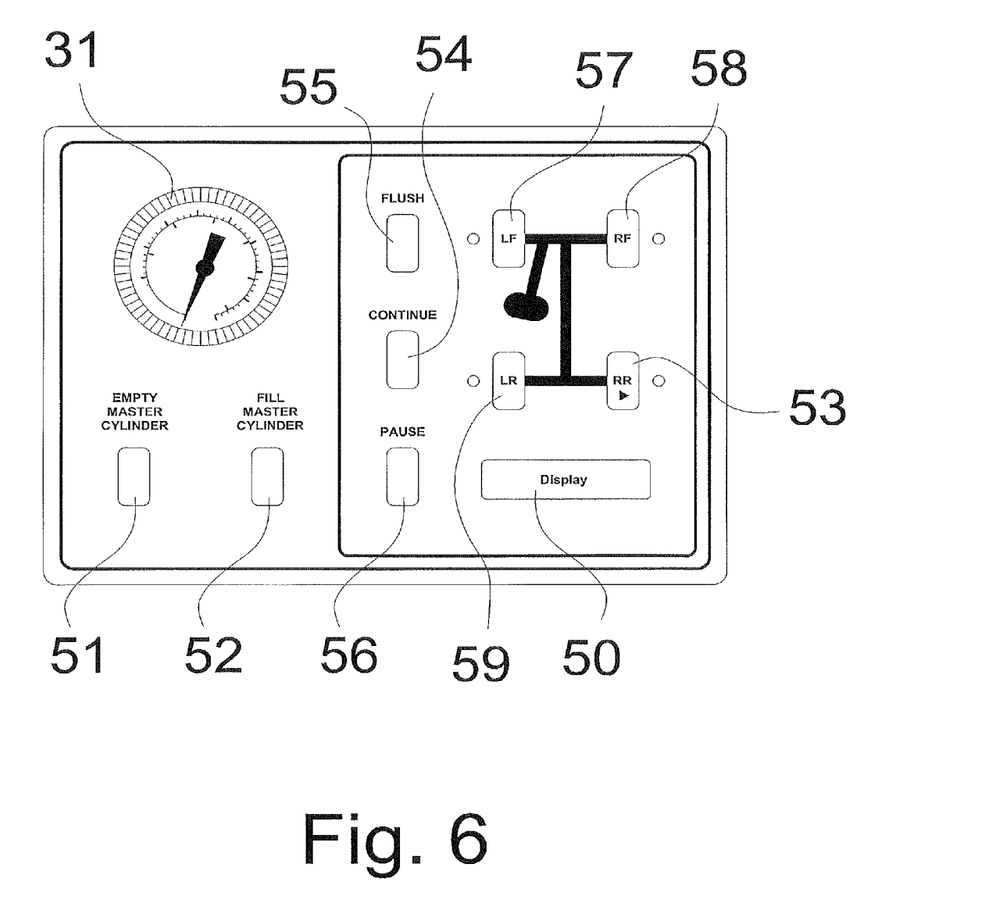
FIG. 6 is a top view of the control panel of the central unit of the automotive service equipment of FIGS. 1A-5.

Hose 24 is then connected to the brake fluid reservoir using a special adapter. New brake fluid from container 22 is pumped by the pump 18 through the hose 24 to the brake fluid reservoir 26 of the brake system. A filter 27 traps any particulate which may be in the new fluid. The flow meter 28 measures fluid flow and gives electrical signals to the central unit controller. The amount of fluid flow used is in the system logic as selected by the technician during initialization as explained below with reference to FIGS. 7A and 7B. A fixed orifice 29 dampens any fluid pulses caused by pump 18. The pressure switch 30 controls the maximum fluid pressure at the brake system reservoir 26. Pressure gauge 31, FIGS. 3 and 6, is for visual indication of the fluid pressure and the system. The waste fluid container 23 has a level switch 32 to prevent overfilling the container with used fluid. The new fluid container 22 has a level switch 33 to stop pump 18 when the level of new fluid is low, preventing the pumping of air into the braking system. A solenoid valve 35 is energized to allow the pump 18 to pump any unused brake fluid from container 22 to container 23. This is an optional choice for the technician if the new fluid will not be used in the near future. Brake fluid absorbs moisture exposed to air for an extended period of time.

For commencing the automatic mode of operation of the automotive service equipment, the technician programs the central unit by selecting the sequence (specified by the vehicle manufacturer) in which fluid will be extracted from each of the brakes of the vehicle. He also selects whether to empty any unused new fluid into the waste fluid container at the end of the fluid exchange procedure. The central unit controller then pumps new fluid into the master cylinder/reservoir of the vehicle brake system and sequentially extracts used fluid from each of the four brakes in the sequential order programmed. The amount of new fluid pumped to each brake is determined by the central unit controller based on the amount of fluid sensed by flow meter 28.

The total amount of new fluid used during the entire exchange of all four brakes is programmed by the technician. Three total amounts (32, 48 and 64 ounces) can be selected in the example embodiment. The central unit controller calculates and then controls the amount of fluid which is exchanged at each of the brakes.

As shown in FIG. 5, the automotive service equipment of the invention can optionally be used with the TechAlert remote module 46 to alert the operator by way of the portable communication module 46 of the status of the equipment operation, e.g. operation complete or operator attention required, for example. For this purpose, the controller of the central unit has a socket 41 and mating jumper plug 40. Insertion of the plug into the socket initiates communication at receptacle 42. A stationary module 45 of the TechAlert with electrical cable 44 and plug 43 is plugged into the receptacle 42. The stationary module 45 includes a wireless transmitter and a wireless receiver coupled to a suitable antenna or other transmission medium coupler for communicating signals wirelessly to the remote module 46 as described in more detail in the aforementioned commonly owned applications incorporated herein by reference. The wireless communication between the remote module 46 and the central unit is shown at $W_2$ in FIG. 5.

Figure 7A:
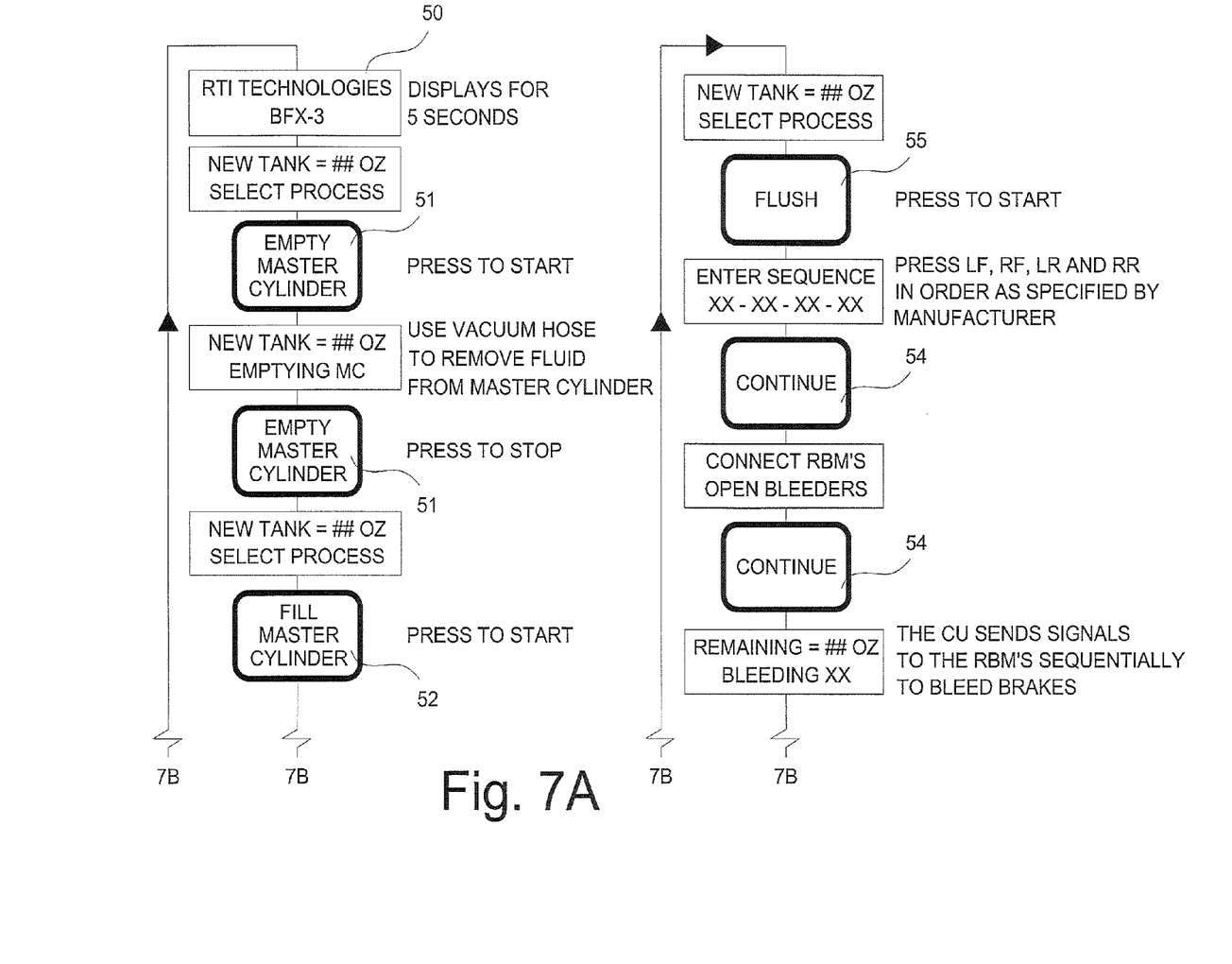
FIGS. 7A and 7B are respective portions of a flow diagram of an automatic mode of operation of the automotive service equipment of the example embodiment of FIGS. 1A-6 showing operator inputs and displays by the equipment to the operator.
Figure 7B:
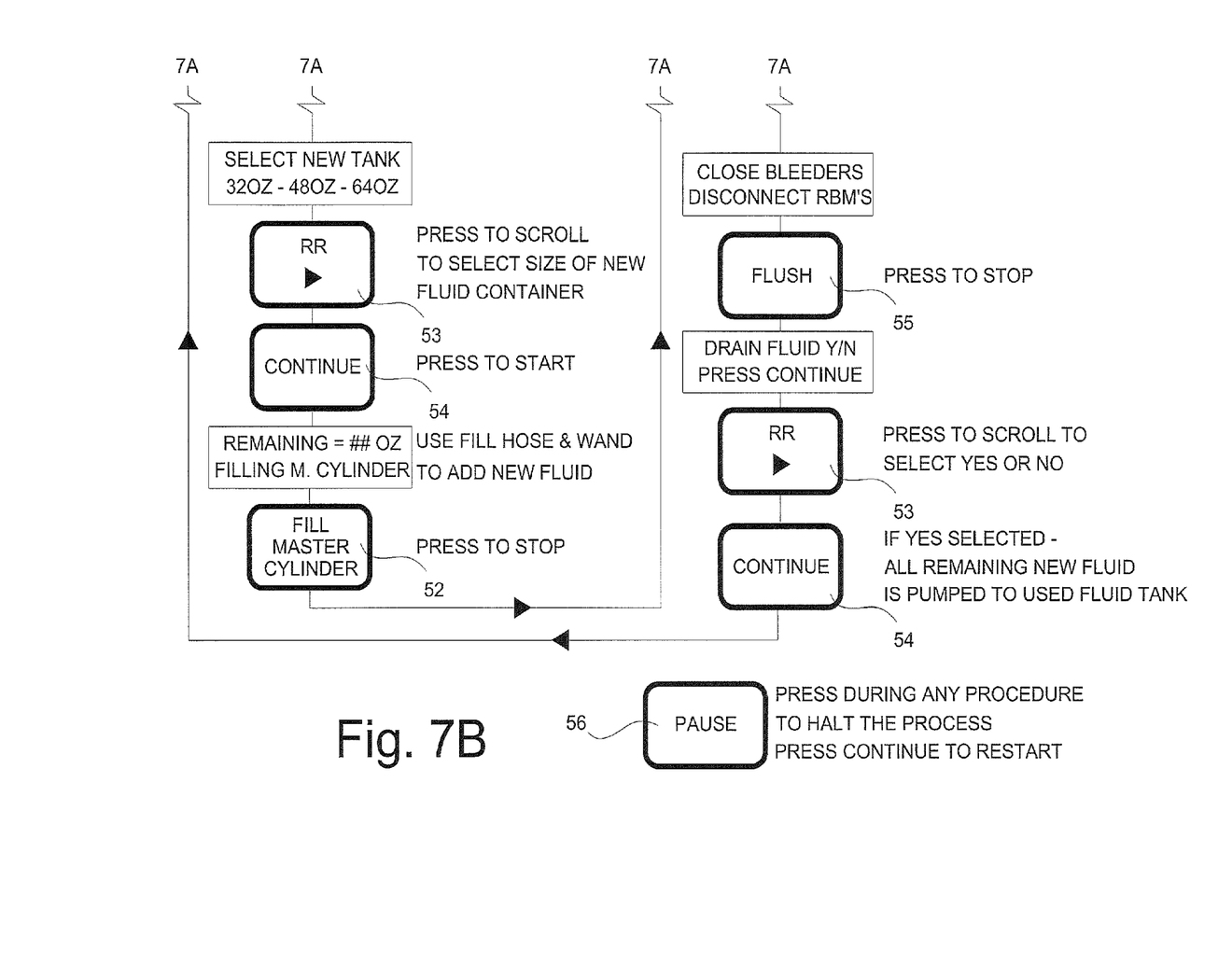

The sequence of steps performed by the equipment for fluid exchange, with operator inputs in response to prompts by the equipment display 50, are set forth in FIGS. 7A and 7B. The push buttons 53, 57, 58 and 59 permit the operator to set the sequence of brake fluid exchange in a vehicle, where LF stands for left front, RF for right front, LR for left rear and RR for right rear brakes to be bled. The several push buttons 51, 52, 54, 55 and 56 are for operator input to respectively empty the master cylinder, fill the master cylinder, continue, flush and pause the operation of the equipment. The flow chart of FIGS. 7A and 7B describes in more detail the operation of the equipment and operator input/control where necessary for brake fluid exchange in accordance with a preferred embodiment of the invention.

Where we have shown and described one preferred embodiment of the present invention, it is understood that the invention is not limited thereto but is subject in numerous modifications and variations which will be apparent to the skilled artisan. As one variation, the automotive service equipment could employ fewer brake bleed modules than the four of the embodiment, where necessarily a module would have to be used with more than one brake bleeder of a vehicle being serviced by connecting and disconnecting the module in sequence with the brake bleeders of a vehicle. A further variation could employ a brake bleed module with two independently controlled solenoids, each connected to a hose. This dual brake bleed module could then be located mid-way between the rear or front brakes with one hose connected to the right side brake and the other hose connected to the left side brake. Thus, the above descriptions of example embodiments are not intended to be limiting. All such modifications coming within the scope of the appended claims are intended to be included therein.

We claim:

1. A method for exchanging brake fluid in an automotive vehicle using an automotive service equipment having a central unit with a controller for operating the equipment in at least one automatic mode of operation, the method comprising:

emptying used brake fluid from a master cylinder of the vehicle;

filling the master cylinder with new brake fluid;

pressurizing the master cylinder;

bleeding brake fluid from brake bleeders of the vehicle and replenishing the new fluid in the master cylinder as necessary;

wherein the brake fluid bled from the brake bleeders is stored in, for later removal from, containers of remote bleed modules connected to respective ones of the brake bleeders.

2. The method according to claim 1, further comprising providing a vacuum charge in the containers prior to bleeding brake fluid from the brake bleeders.

3. The method according to claim 2, including providing the vacuum charge in the containers while the modules are docked at respective docking stations at the central unit, undocking the vacuum charged modules from the central unit, moving the modules to brake locations, and connecting the modules to respective ones of the brake bleeders.

4. The method according to claim 1, further comprising, after brake fluid exchange, disconnecting the modules from the brake bleeders, moving the modules to respective docking stations at the central unit, and removing brake fluid from the containers.

5. The method according to claim 1, including controlling the brake fluid bleeding at the brake bleeders from the central unit with wireless communications from the central unit to the modules.

6. The method according to claim 5, wherein the central unit signals the modules to bleed brake fluid from the brake bleeders sequentially.

7. The method according to claim 5, wherein the central unit signals the modules to alert an operator via indicators at the modules to close the brake bleeders sequentially.

* * * * *